US010360752B1

(12) United States Patent
Riedel

(10) Patent No.: US 10,360,752 B1
(45) Date of Patent: Jul. 23, 2019

(54) SLOT MACHINE DEVICE WITH DYNAMICALLY GENERATED REEL STRUCTURES

(71) Applicant: Andrew Riedel, Redwood City, CA (US)

(72) Inventor: Andrew Riedel, Redwood City, CA (US)

(73) Assignee: Playstudios, Inc., Las Vegas, NV (US)

( * ) Notice: Subject to any disclaimer, the term of this patent is extended or adjusted under 35 U.S.C. 154(b) by 0 days.

(21) Appl. No.: 14/990,734

(22) Filed: Jan. 7, 2016

(51) Int. Cl.
*G06F 17/00* (2006.01)
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 8,460,092 | B1 * | 6/2013 | Slomiany | G07F 17/326 463/19 |
| 8,992,319 | B1 | 3/2015 | Pascal | |
| 2005/0056999 | A1 * | 3/2005 | Roemer | G07F 17/32 273/273 |
| 2007/0205556 | A1 * | 9/2007 | Roemer | G07F 17/32 273/273 |
| 2014/0228092 | A1 * | 8/2014 | Inamura | G07F 17/3267 463/20 |
| 2015/0038219 | A1 * | 2/2015 | Janosov | G07F 17/3244 463/25 |

* cited by examiner

*Primary Examiner* — Ronald Laneau
(74) *Attorney, Agent, or Firm* — Muskin and Farmer LLC

(57) ABSTRACT

A method, apparatus, and computer readable storage to implement a tile matching game. A grid is populated with a set of randomly selected tiles out of a set of available tiles. The set of available tiles is much smaller than the number of tiles on the grid. The player's goal is to select matching groups of tiles which are then dissolved and the tiles in the grid cascade down with new random tiles dropping from above to fill any empty spaces. A set of slot machine reels can form when three or more like tiles are adjacent to each other in a row on the grid. The set of slot machine reels can spin like a slot machine with awards being made when a final outcome of symbols matches a winning combination on a paytable.

20 Claims, 12 Drawing Sheets

SLOT MACHINE DEVICE WITH DYNAMICALLY GENERATED REEL STRUCTURES

BACKGROUND OF THE INVENTION

Field of the Invention

The present general inventive concept is directed to a method, apparatus, and computer readable storage medium directed to an apparatus, method, and computer readable storage medium to implement a slot machine game with dynamically generated reel structures.

Description of the Related Art

The gaming industry is a billion dollar industry. What is needed is a new system which players will find enjoyable.

SUMMARY OF THE INVENTION

It is an aspect of the present invention to provide players with an enjoyable slot machine type game.

This together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
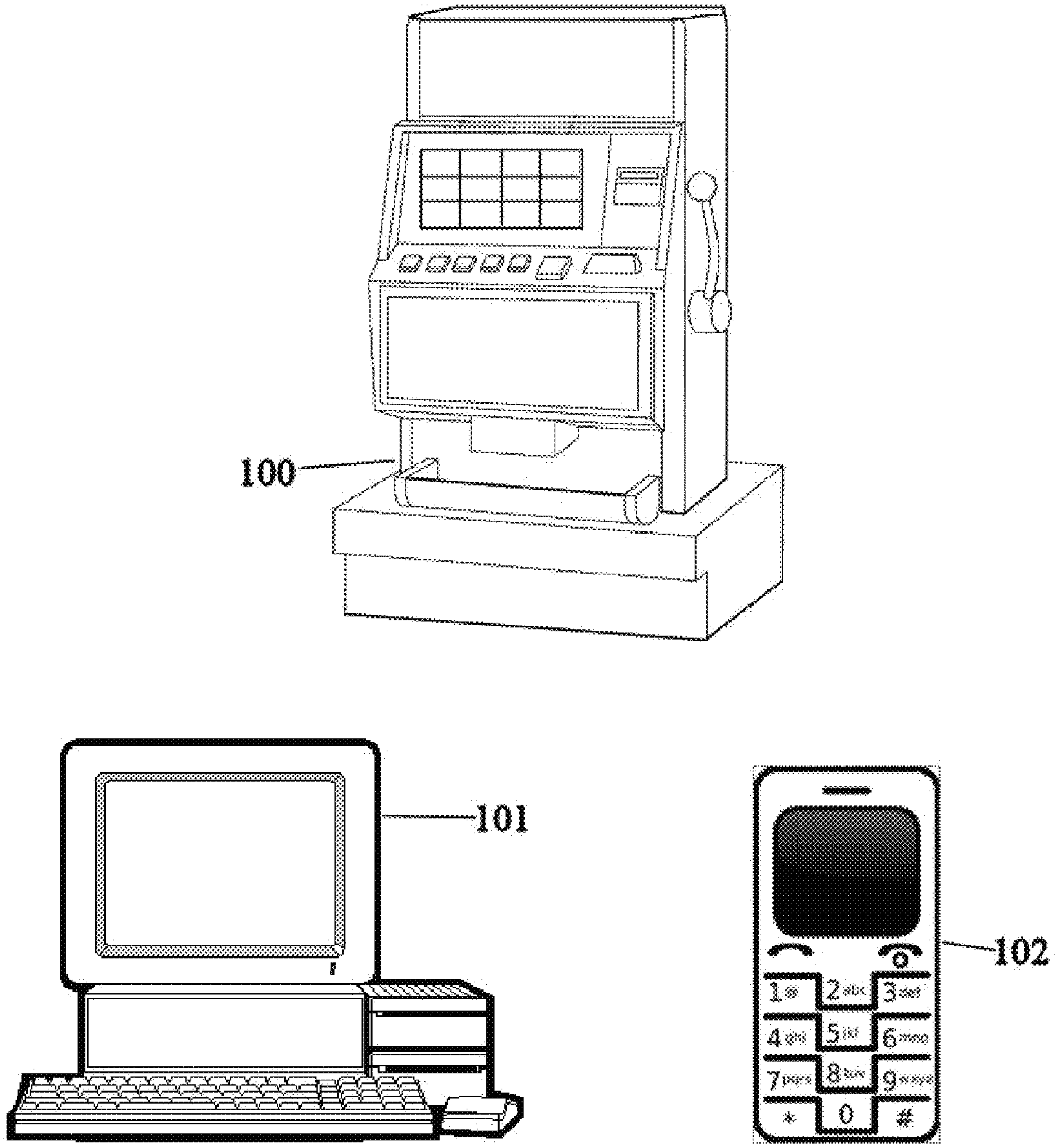
FIG. 1 is a drawing illustrating numerous apparatuses that can play the game described herein, according to an embodiment.

Reference will now be made in detail to the presently preferred embodiments of the invention, examples of which are illustrated in the accompanying drawings, wherein like reference numerals refer to like elements throughout.

The present inventive concept relates to combining experiences on physical electronic gaming devices found in casinos (e.g., slot machines) with games that can be played online. Online games can include games played on a social networking site such as FACEBOOK (including what is described in U.S. Pat. No. 7,669,123 which is incorporated by reference herein in its entirety), MYSPACE, or any other site which maintains a database of users and provides an interface for interaction.

Players can earn a loyalty points (also referred to herein as secondary currency or virtual points) by playing online (using a computer using the internet to play an online game such as one on FACEBOOK). Loyalty points typically have no cash value. The online game can be an online casino or any other game. The secondary currency/loyalty points can be earned as described herein. These loyalty points can then be used to augment real life play on an electronic gaming machine at a casino (e.g., slot machine, video poker machine, etc.) The final result is the merging of online play and real life play so that players can benefit from a synergy of the two experiences. Loyalty points can also be redeemed for tangible goods. For example, a list of tangible items (e.g., free room at a particular hotel, show tickets for a particular show, deck of playing cards, etc.) can all be displayed alongside a cost in loyalty points, and the player can choose which item the player wishes to receive upon which the respective number of loyalty points will be deducted from the player's account (assuming the player has the required number of loyalty points) and the player will be delivered the item (electronically such as via an email/text or physically).

FIG. 1 is a drawing illustrating numerous apparatuses that can play the slot machine game described herein, according to an embodiment.

The game described herein can be played on an electronic gaming machine 100 that can found in brick and mortar casinos or other venues such as internet cafes, etc. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the electronic gaming machine 100 from a central remote server.

The game described herein can also be played on a computer 101 such as a personal computer, laptop, etc. The game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social network site itself. "Casual play" is where the game can be played not for real money but for credits which typically have no cash value, but can have other benefits to the player.

The game described herein can also be played on a cell phone 102 or any other type of portable device, such as a tablet computer, etc. The portable device can implement any of the paradigms described herein with respect to the computer 101 (e.g., online casino, social networking site, etc.)

Figure 2:
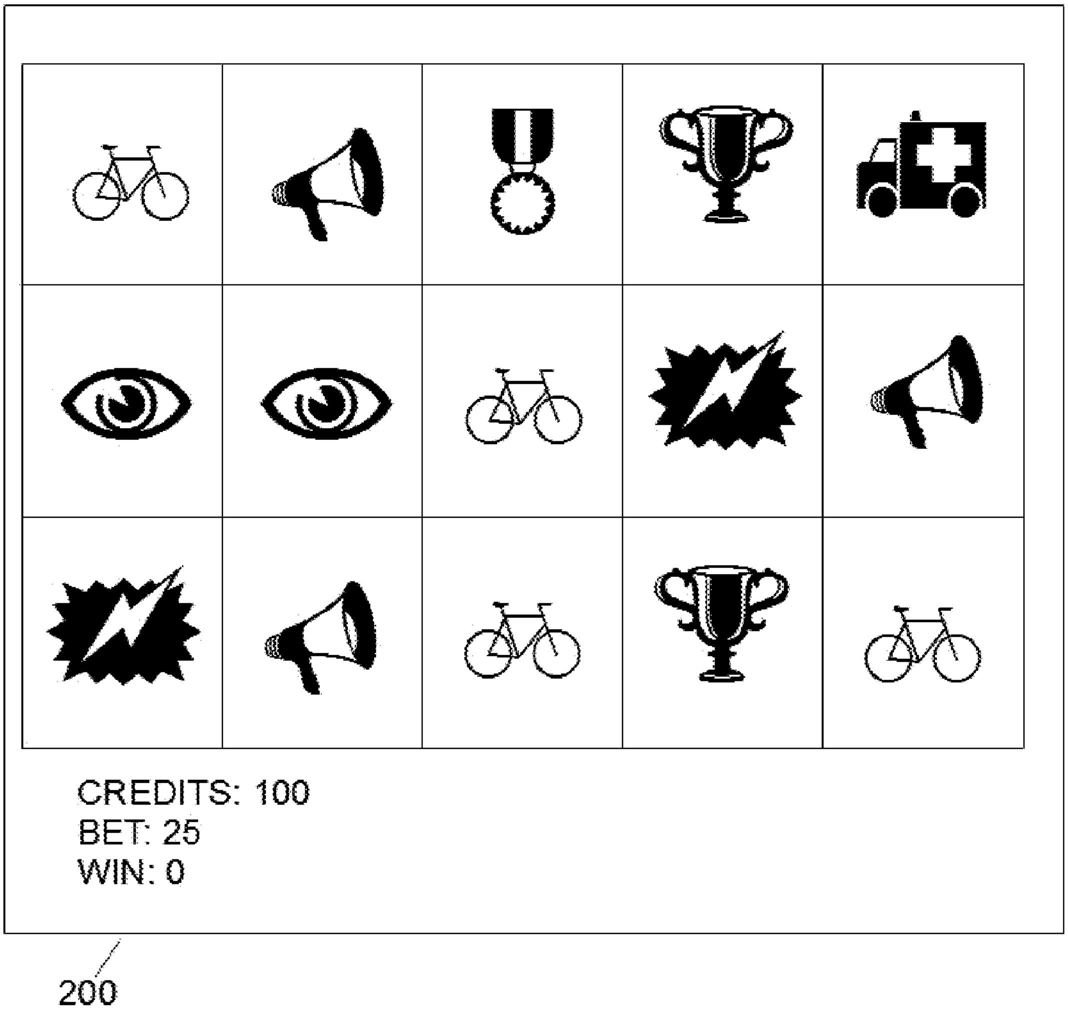
FIG. 2 is a drawing of a slot machine game that can be played online or on a physical electronic gaming machine, according to an embodiment.

FIG. 2 is a drawing of a slot machine game that can be played online or on a physical electronic gaming machine, according to an embodiment.

The slot machine game can be any type of slot machine game, such as three rule, five rule, etc. For an example of a slot machine game, see U.S. Pat. No. 8,251,798 which is incorporated by reference herein in its entirety.

Figure 4:
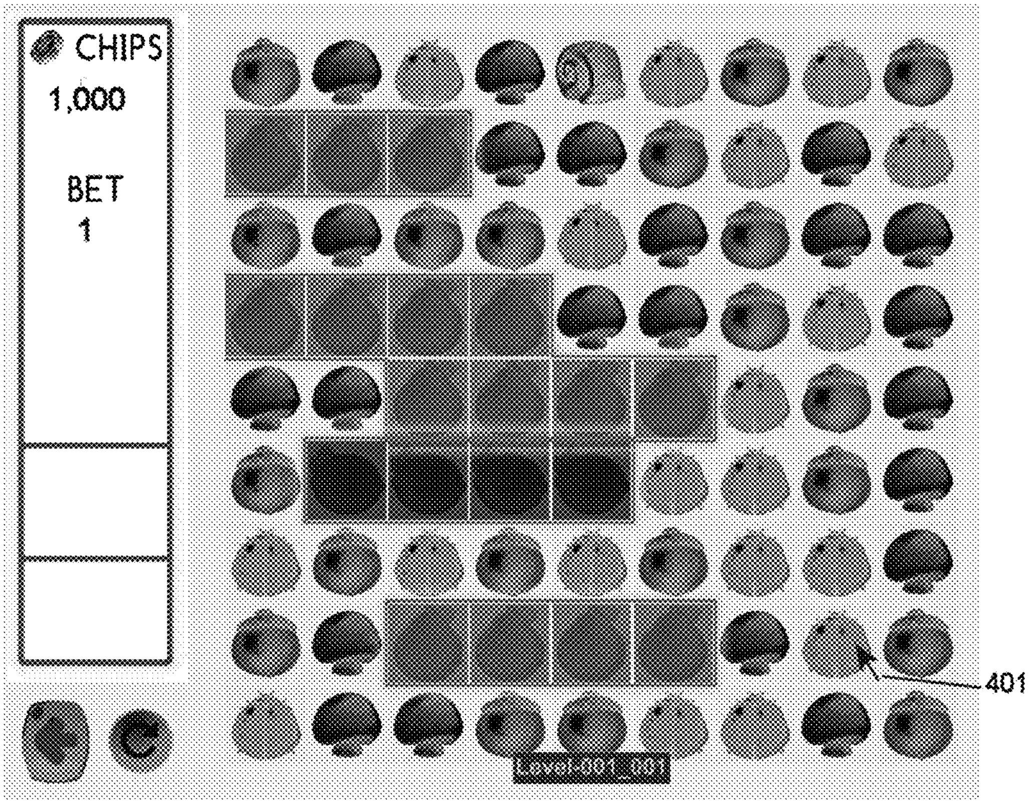
FIG. 4 is a screen shot of a tile matching game, according to an embodiment.

The game/methods described herein can be played as a stand-alone game or as a bonus game to a slot machine game such as the kind illustrated in FIG. 2. Special symbols can trigger the bonus game. In another embodiment, the player can accumulate special symbols in the main slot machine game and when the player accumulates enough symbols then the bonus game (as illustrated in FIG. 4) would be initiated.

"Cash credits" refers to credits the player may have on an electronic gaming device which can be cashed out instantly for a cashless voucher which is redeemable for cash at a ticket redemption machine or casino cashier cage. For example, a player deposits a $100 bill into a bill validator in an electronic gaming machine, he has $100 cash credits. Assuming the player plays the electronic gaming machine and wins $50, the player's credit meter reflects that he has $150 cash credits in which the player can immediately cash out at any time and redeem for cash.

Non cash value credits (also referred to as non cash value chips) are credits which cannot be directly converted into cash. Non cash value credits can be used to play a slot machine game (or any other electronic wagering game). Non cash value credits can be purchased using cash or earned by completing tasks. Some non-cash value credits may be given away for free to players who meet certain conditions.

Thus, a player can enter a casino and play an electronic gaming machine with cash credits (by depositing cash, depositing a cashless voucher which has a particular value of cash credits, or by using any other cash deposit mechanism such as an electronic deposit of funds, etc.) The player can augment his play of the electronic gaming machine by using loyalty points the player has earned online. Of course, there must be some communication between the player's loyalty points that he has earned with the electronic gaming machine (the source of the loyalty points and the operator of the electronic gaming machine would typically have to be operating in conjunction with each other). The source of the earned loyalty points can be outside the casino, such as an online casino server unrelated (or possibility affiliated with) the casino the player is playing in.

Figure 3:
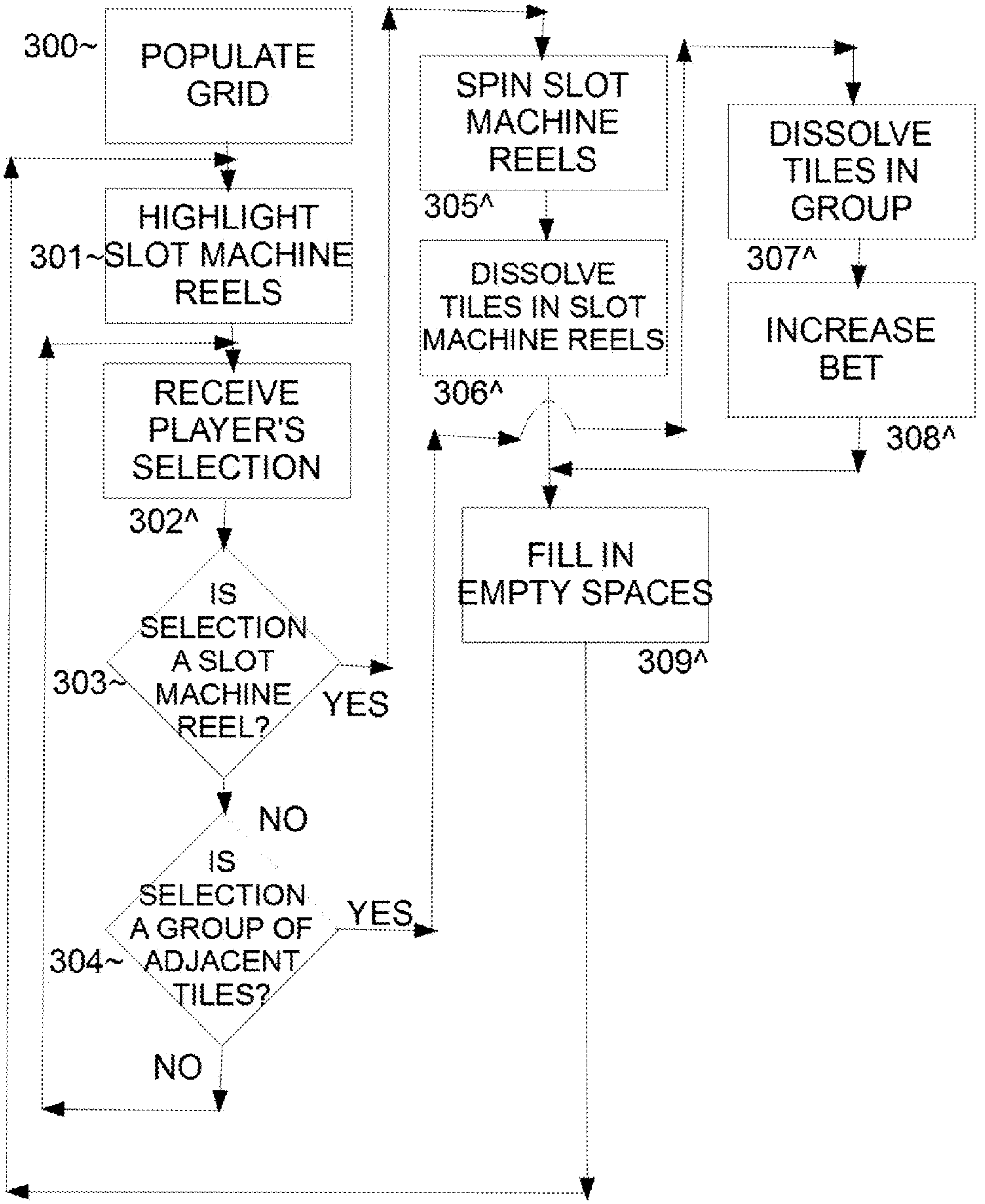
FIG. 3 is a flowchart illustrating an exemplary method of implementing a method to dynamically generate reel structures, according to an embodiment.

FIG. 3 is a flowchart illustrating an exemplary method of implementing a method to dynamically generate reel structures, according to an embodiment.

The method begins with operation 300, which populates the grid with random symbols (also referred to as icons or tiles). See FIG. 4 for one example of such a grid. The symbols/tiles can be chosen randomly for each position in the grid. In an embodiment, some tiles may be more frequent than others (e.g., a mushroom icon may appear twice as often as an acorn icon). In other words, the selection of tiles is still random but some tiles may be weighted different than others so that they would have a higher probability of being chosen.

From operation 300, the method proceeds to operation 301, which highlights slot machine reels in the grid. See FIG. 4 for an example of highlighted slot machine reels. Any row with three or more adjacent like tiles will be considered slot machine reels. If there are multiple slot machine reels of the same tile vertically adjacent (meaning at least N or more tiles directly above/below each other, wherein (depending upon the embodiment) N can be 1, 2, 3, 4, 5, or more) then these rows of slot machine reels would be merged with other rows to form one set of slot machine reels on two or more rows and would be highlighted as the same set of slot machine reels. See the pairs in rows 3 and 4 of FIG. 4, there are two tiles that are vertically adjacent to each other so these two slot machine rows are now merged to become one set of slot machine reels.

The highlighting slot machine reels can be done by an algorithm that cycles through each tile in the grid and examines its neighbors to identify all sets of at least three horizontally adjacent tiles. Once the entire grid has been evaluated like this, then all identified slot machine reels are evaluated to see which ones are vertically adjacent to each other with the ones being vertically adjacent then merged together to form a single set of slot machine reels. The different sets of slot machine reels on the grid are all highlighted so that the player can easily identify the individual slot machine reels on the grid. It is very possible that a grid will have no slot machine reels. Over time, the player's goal will be to eliminate groups in order to try to "build" slot machine reels that the player can then spin and earn points (or credits) from.

From operation 301, the method proceeds to operation 302 which receives the player's selection. The player will continuously select a tile (or group) in order to activate that group. The player selects a tile by touching it (on a touch-screen). If the game is not being played on an active touch-screen, then the player can control a pointer using an input device (e.g., keyboard, mouse, joystick, etc.) to move a cursor to point to a particular symbol. The player can then activate that symbol by pressing a button (e.g., mouse button, etc.) If the player has not made a selection then operation 302 can continuously repeat (awaiting for the player to make a selection).

From operation 302, the method proceeds to operation 303 (after a selection of a tile is made by the player) and determines whether the tile selected by the player (e.g., the tile touched or pointed to) is part of a slot machine reel. Operation 301 would store a data structure (e.g., a list) of all current slot machine reels. This can be done by assigning a number to each symbol, the number representing a particular slot machine reel (with 0 meaning the symbol is not part of a slot machine reel). So when a symbol (tile) is selected, it can easily be checked whether it is part of a slot machine reel. If the selected symbol is not part of a slot machine reel, then the method proceeds to operation 304. If the selected symbol is part of a slot machine reel, then the method proceeds to operation 305.

If in operation 303, it is determined that the selected symbol is not part of a slot machine reel, then the method proceeds to operation 304 which determines whether the selected symbol is part of a group of adjacent tiles. A group of adjacent tiles must be two or more tiles that have an adjacent member (either horizontally or vertically). This can be determined by examining all symbols neighboring the selected tile to determine if there is a like horizontal or vertical neighbor (thus there will be four such tiles to check unless the selected tile is on the edge of the grid). If the selected tile is not part of a group of like tiles, then nothing will happen and the method returns to operation 302 which continues to await the player's selections. If in operation 304, the selected symbol is indeed part of a group of like tiles, then the method proceeds to operation 307.

In operation 305, the slot machine reels that were selected in operation 302 are now activated. The reels will spin. Each space in the grid now becomes a slot machine reel which will stop on a random slot machine symbol. The slot machine symbols are typically different than the tiles used in the grid. Table I below illustrates one example of a set of slot machine symbols that can be used for the slot machine reel.

TABLE I

| Position | symbol |
|---|---|
| 1 | cherry |
| 2 | 7 |
| 3 | blank |
| 4 | pepper |
| 5 | bar |
| 6 | heart |
| 7 | cherry |
| 8 | blank |
| 9 | pepper |
| 10 | pepper |
| 11 | star |
| 12 | 7 |
| 13 | blank |
| 14 | wild |
| 15 | heart |
| 16 | blank |

For example, each space in the set of slot machine reels would spin (show a blurring animation giving the illusion of spinning) and then take on a random value from Table I (the slot machine reel mapping). Note that some symbols are weighted more frequently than others. When all of the reels are done spinning, then the final outcome can be evaluated against a paytable to determine whether the player will be awarded any points (or credits, etc.) or not. There can be a number of different paylines, and for each payline, if the symbols on the respective payline correspond to a winning predetermined combination then the player is paid according to a respective payout. Table II illustrates on example of a paytable.

TABLE II

| Combination | Payout |
|---|---|
| wild-wild-wild | 1000:1 |
| 7-7-7 | 500:1 |
| pepper-pepper-pepper | 100:1 |
| heart-heart-heart | 50:1 |
| bar-bar-bar | 25:1 |
| cherry-cherry-cherry | 5:1 |
| Any two cherries | 2:1 |
| Any one cherry | 1:1 |
| All others | lose (0 payout) |

A plurality of paytables can be used, each one for a particular number of symbols on the payline. For example, Table II illustrates a paytable to be used for a three symbol payline. Table III is an example of a paytable that can be used for a four symbol payline. There can be any number of such paytables for all possible sizes of paylines (e.g., from 3 to the number of columns on the grid).

TABLE III

| Combination | Payout |
|---|---|
| wild-wild-wild-wild | 5000:1 |
| 7-7-7-7 | 1000:1 |
| 7-7-7-any | 800:1 |
| Any three 7's | 700:1 |
| heart-heart-heart-heart | 500:1 |
| heart-heart-heart-any | 400:1 |
| any three hearts | 200:1 |
| any three bars | 150:1 |
| cherry-cherry-cherry-cherry | 100:1 |
| any three cherries | 2:1 |
| any two cherries | 1:1 |
| all others | lose (0 payout) |

Note that multiple paylines can be used. A payline is a set of positions on the set of slot machine reels which are combined to form a final outcome (combination) which is compared against the paytable. A set of arbitrary paytables can be used for each set of slot machine reels. Or, in an embodiment, all possible paytables can be used for the particular set of slot machine reels used. In other words, every possible combination of symbols from left to right can be used as paytables. For example if a set of slot machine reels is 3 by 3, then there would be 3*3*3=27 paylines in total (every possible combination of symbols from left to right). A set of slot machine reels which is 3 (horizontally) by 2 (vertically) would have 8 (2 multiplied by 2 multiplied by 2) paylines. A set of slot machine reels which is 2 (horizontally) by 3 (vertically) would have 9 (3 multiplied by 3) paylines. In the case of a non-rectangular set of slot machine reels, then the number of paylines will be computed by multiplying each number of vertical positions in the set of slot machine reels from left to right. For example, in FIG. 11, a first slot machine reel 1100 has only one payline (since it has no more than one row in each position). A second set of slot machine reels 1101 has eight paylines (it is rectangular shape with three columns and two rows so 2*2*2=8 which is the maximum possible paylines). A third set of slot machine reels 1102 has one row in the first column and then two rows in the second column and then three rows in the third column and then three rows in the fourth column and then three rows in the fifth column and then two rows in the six column, which mean 1*2*3*3*3*2=108 paylines used. Of course, other payline paradigms can be used as well and the "maximum paylines" is only one possible method. In the set of slot machine reels in FIG. 8, there would be 1*1*2*2*1=4 paylines. These paylines would result in the following four combinations: 7/heart/pepper/7/7; 7/heart/pepper/7/7; 7/heart/7/7/7; 7/heart/7/7/7.

Note that the bet per payline can be computed in numerous ways. The bet (computed in operation 308) can be divided equally across the number of paylines and that amount would be bet on each payline. In another embodiment, the bet (computed in operation 308) can be applied individually to each payline (for example if the bet is 5 credits and there are 9 paylines then 5 would be bet on each payline for a total wager of 45).

Note that the slot machine game can offer any type of functionality of a standard slot machine, such as scatter symbols (which are paid based on a quantity of scatter symbols appearing regardless of where they appear), respin symbols, multiplier symbols, etc. In operation 305, each of the combinations of tiles (symbols) on each payline is applied to the respective paytable, and all winning combinations are paid (added to the player's current credit meter (also referred to as chip meter)). Each winning combination is paid based (multiplied by) the bet on each respective payline. For example, if the bet is 2 units (e.g., credits, chips, etc.) per payline then the respective winning combination would be paid at the respective payout on the paytable (e.g., see example paytables in Table II or Table III) multiplied by 2 (the payline bet).

Note that after the spin is complete, the bet can now be reset to a starting point (e.g., reset to 1 or other predetermined number). This bet is increased each time operation 308 is performed.

From operation 305, the method proceeds to operation 306, which then dissolves (removes) the tiles in the set of slot machine reels so they are blank spaces. Then from operation 306, the method proceeds to operation 309 which causes the tiles above the blank spaces to "fall" to fill in the blank spaces (as discussed with regard to operation 309).

In operation 307, the tiles in the selected group (selected in operation 302) are dissolved (removed so they are blank spaces). This can be done using a "dissolve" animation. All of the tiles in the group are identified by starting with the tile selected (the tile touching or closest to the pointer or touch operation when selected in operation 302) and recursively traversing all adjacent tiles (horizontally and vertically) and their adjacent tiles (horizontally and vertically) and so on until the entire group of like tiles has been identified.

From operation 307, the method proceeds to operation 308, which increases the player's bet. The bet is a running total (which can be reset when slot machine reels are spin in operation 305). The bet can be increased based on the number of tiles in the selected group (which are dissolved in operation 307), e.g., increased by the number of tiles in the group or the number of tiles in the group multiplied by a constant (e.g., 2 or other number). The bet can also be increased by adding a tile value (a predetermined constant for each particular tile type) of all of the tiles in the group selected (e.g., the number of tiles in the group multiplied by the respective tile value for the particular tile of the group).

From operations 306, 308 the method proceeds to operation 309, which fills in the empty spaces on the grid. Empty spaces are created in operations 306 and 307. The symbols will then "cascade" or fill in (travelling straight from top to bottom) until all of empty (blank spaces) created in operations 306 and 307 are filled in. Now there will be some empty spaces on the top of the grid representing the tiles that fell downward to fill in the empty spaces. Random tiles can fall straight from above the grid and travel straight from top to bottom until all empty spaces are now filled in with the random tiles.

Note that the symbols used to fill in the empty spaces are grid tiles, not slot machine tiles. Grid tiles are shown in the figures as mushrooms, bugs, acorns, etc., but these are not the symbols used in the slot machine game. Thus, there are two sets of symbols used in the game, grid tiles (i.e. the symbols used for the grid tiles) which are used to populate the grid and not for the slot machine reels, and slot machine symbols which are used only when the reels of the set of slot machine reels stop spinning which then reveal slot machine symbols. For example, Table I represents slot machine symbols but these symbols are not used to populate the grid (e.g., when the grid is initially formed or when empty spaces are filled in with grid tiles). In an embodiment, a power-up symbol may be an exception in which a symbol used for the slot machine game which appears on the reel can also appear on the grid. In another embodiment, it is not possible for the two different types of symbols (grid symbols, slot machine symbols) to be interchanged or for a slot machine symbol to be used on the grid.

From operation 309, the method returns to operation 301 wherein the game continues.

FIG. 4 is a screen shot of a tile matching game, according to an embodiment.

A game is displayed to the player which displays a grid (9 by 9 is shown but any other dimensions can be used and a square is not required) which symbols in each position. There are a predetermined number of tiles (in this example there are five icons/tiles: pear, bug, snail, mushroom, acorn) although other numbers of tiles can be used as well. Each position in the grid (also referred to as the matrix) has only one icon (or in some cases no tiles or can have partial tiles when tiles are falling down).

When like (matching) tiles are adjacent (connected), they can be clicked (in operation 302) and then the like tiles would dissolve (disappear) (in operation 307) and the tiles above the dissolved tiles in each column would fall down (simulating gravity) to fill in (operation 309) any empty spaces in the grid. New random tiles can fall from the top of each column to fill all empty spaces on the top of the column as needed (operation 309). Adjacent tiles means tiles (also referred to as tiles) which are adjacent horizontally or vertically but not diagonally (if there is no connecting like icon to the group horizontally or vertically).

For example, if the upper left icon is considered x, y position (1,1) then there are mushrooms at positions (4,1), (4, 2) and (5,2) which are all connected. The mushroom tile at (4,2) is vertically adjacent to the mushroom tile at (4,1) and horizontally adjacent to the mushroom tile at (5,2). Thus, all three of these mushroom tiles are connected (adjacent) and part of the same group. Note that the mushroom tile at (6,8) is not considered adjacent to the mushroom tile at (5,2) because diagonal tiles only (without a horizontal or vertical connecting matching tile in the group) are not considered to be adjacent. Thus, the there is a group of only three mushrooms at (4,1), (4,2) and (5,2) which can be selected by the player.

Another group on this particular grid is the group of six bugs at (7,5), (7,6), (7,7), (6,6), (8,7) and (8,8). The player is free to click any group the player desires in order to eliminate that group. "Click" means using a control device (e.g., touching a touch-screen, pointing a cursor using mouse and pressing a button, pointing a cursor using a track pad and pressing a button, using a keyboard, etc.) to select a tile (or area) which is part of the group of tiles the player wishes to select. An input device can be used to move a cursor to point to the group the player wishes to select and then a button (or other input device) can be pressed to select (activate that group). In the case of a touch-screen, the player simply needs to touch a tile which is part of the group the player wishes to select.

Note that horizontally adjacent rows of three or more like tiles automatically form a set of slot machine reels and are automatically highlighted by the game. For example, the pears at (1,2), (2,2), and (3,2) are all highlighted (darkened) to signify that they are part of a set of slot machine reels. Note that there is another set of slot machine reels at (1,4), (2,4), (3,4), (4,4), (3,5), (4,5), (5,5), and (6,5). Since the two rows connect at at least one tile vertically they are merged into the same set of slot machine reels. This set of slot machine reels can be selected and hence spun in operation 305. The row of tiles at (2,6), (3,6), (4,6), and (5,6) are of a different icon and thus do not become part of the same set of slot machine reels as the above pears.

Each time a group of like tiles is selected (also referred to as "tapped"), they will disappear and the above tiles will drop down vertically (in the same column) filling any holes with new tiles dropping from above to fill any empty spaces on top. This process can repeat by the player continuously selecting new groups to dissolve (which triggers the drop down and filling with new tiles) and form new sets of slot machine reels. The player can be awarded points for each group that is dissolved. For example, a point can be awarded for each tile in a group that is dissolved. In an embodiment, larger groups can be awarded disproportionate amounts of points. For example, a group of three like tiles can award 3 points, a group of 4 like tiles can award 10 points, a group of 5 like tiles can award 20 points, a group of 6 like tiles can award 50 points, a group of 7 like tiles can award 250 points, etc. Different tiles can also result in different awards for dissolving their respective groups, for example dissolving mushrooms may result in the awards described above, wherein dissolving bugs (which may be less frequent than mushrooms) will result in a 2× (two times) award that the same number of mushrooms would award, and dissolving acorns (which may be less frequent than bugs) would result in a 5× (five times) award that the same number bugs would award. Of course, these are all merely examples and different payout structures can be used which are based on which icon is being dissolved and how many of those tiles are in the group.

Note that selecting adjacent tiles will also cause a player's bet to increase. For example, a bet can begin at a value of 1 (or other predetermined amount). The bet would then increase based on each time adjacent tiles are selected (tapped) and hence dissolved. For example, each time a group of adjacent tiles is selected, the bet can increase by one; or each time a group of adjacent tiles is selected the bet can be increased by the number of tiles in the group; or each time a group of adjacent tiles is selected the bet can be increased by the number of tiles in the group multiplied by a tile value (each tile can have its own tile value, for example mushrooms can have a tile value of 1, acorns can have a tile value of 2, bugs can have a tile value of 4, etc.) When a set of slot machine reels is activated (spun) then this bet (also referred to as bet amount) is then bet on the slot machine spin and the award amount based on the outcome is multiplied by the bet to determine the final amount awarded to the player (added to the player's credits).

The player can also select (by touching a touch-screen or using a pointing device with a button) any slot machine reels that are formed in the grid to activate (spin) those slot machine reels. Each icon in a set of slot machine reels then becomes an individual reel in a slot machine game and all such individual reels will spin and stop on a random symbol. The result is a final slot machine outcome and an award can then be paid to the player based on a paytable applied to the final slot machine outcome.

Note that cursor 401 is positioned by the player using a pointing device (e.g., mouse) to select a tile and then the player can press a button to actually initiate the selection. Alternatively, a touch-screen can be used wherein the player simply touches the selected tile (without the need for a separate click of a button or the cursor).

Figure 5:
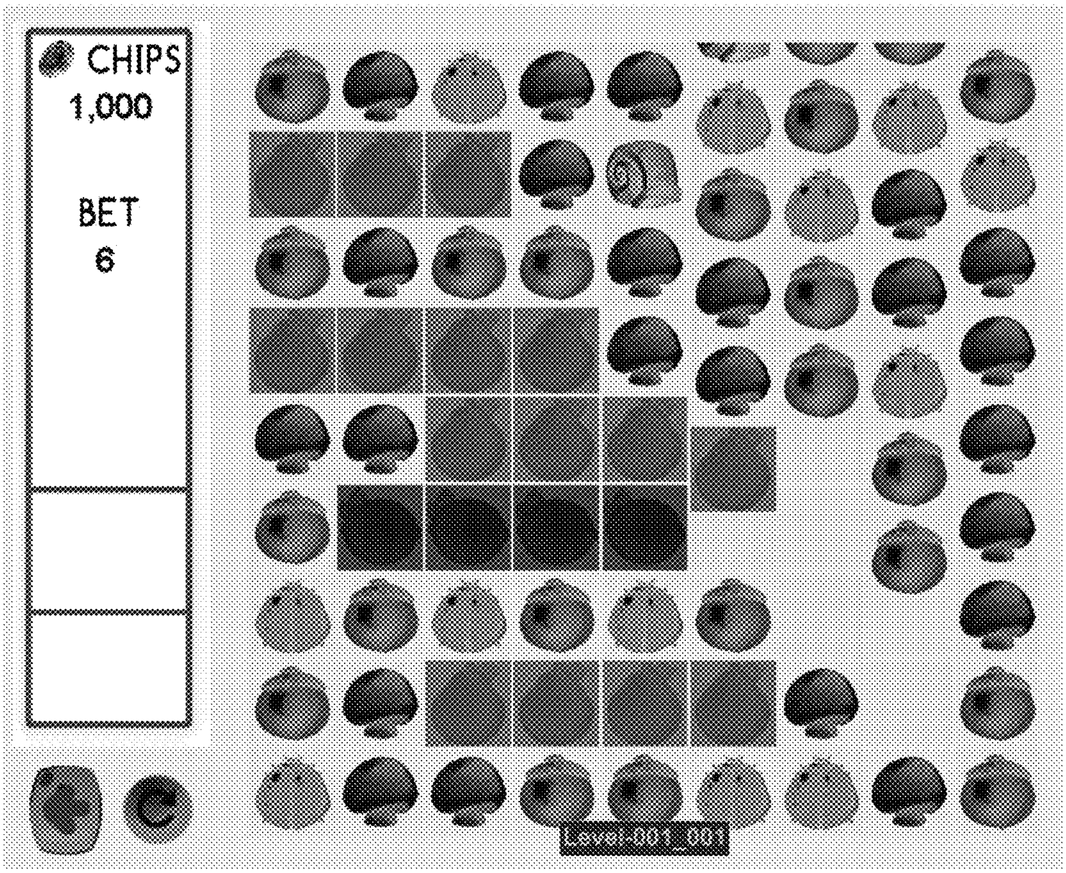
FIG. 5 is a screen shot of a tile matching game after a selection of matching tiles is eliminated, according to an embodiment.

FIG. 5 is a screen shot of a tile matching game after a selection of matching tiles is eliminated, according to an embodiment.

Not that one of the bugs in the group of bugs at positions (7,5); (7,6); (7,7); (6,6); (8,7); (8,8) in FIG. 4 was selected (in operation 302) by the player. This causes the six tiles in this group to dissolve (an optional animation) and disappear (as shown in FIG. 5). This is performed in operation 307.

Figure 6:
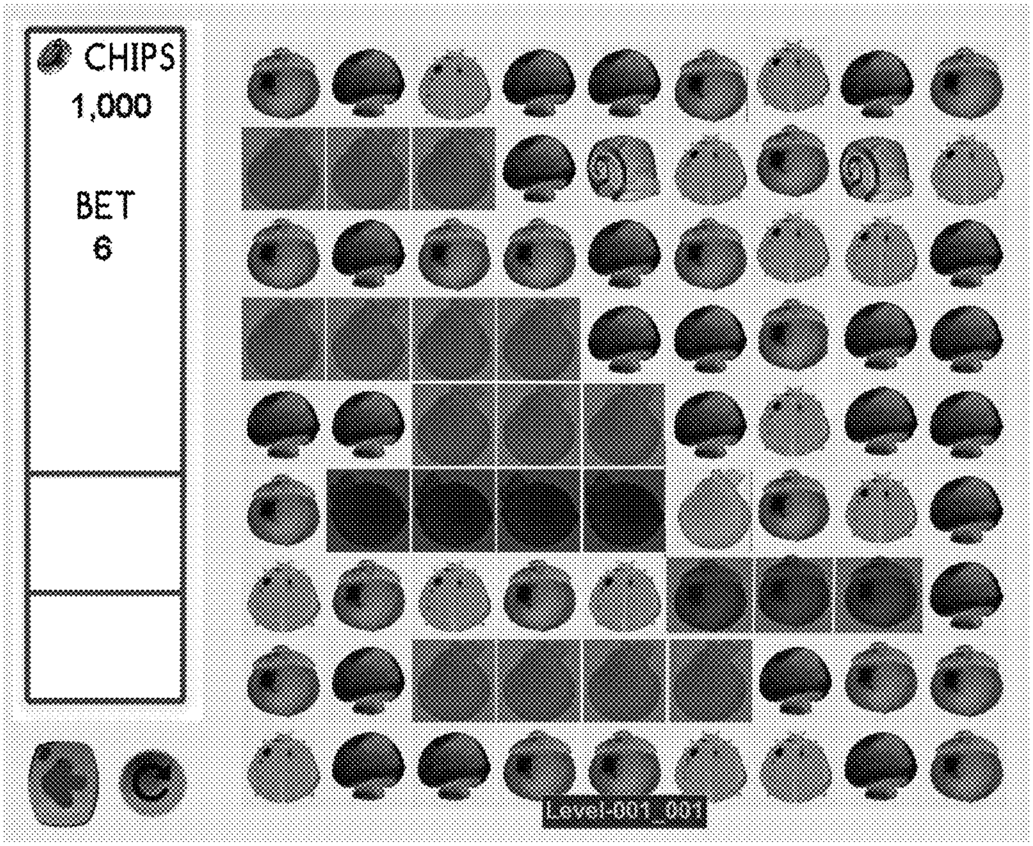
FIG. 6 is a screen shot of a tile matching game after tiles have fallen to replace empty spaces, according to an embodiment.

FIG. 6 is a screen shot of a tile matching game after tiles have fallen to replace empty spaces, according to an embodiment.

After the tiles disappear in FIG. 5, then the tiles will move down (operation 309) to fill in the gaps. FIG. 6 illustrates the completion of this process after FIG. 5. Note how all of the tiles have travelled ("fallen") down their column from top to bottom and random tiles have replaced empty spaces on the top of the grid.

Figure 7:
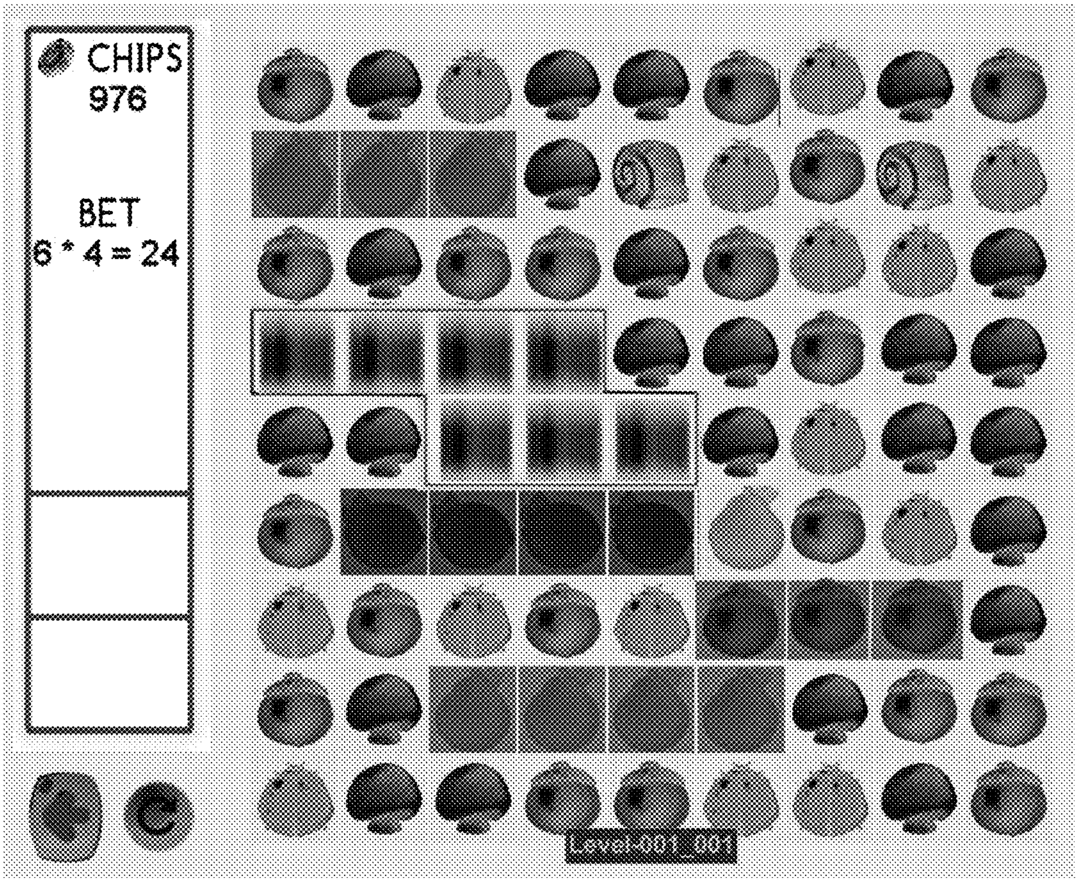
FIG. 7 is a screen shot illustrating a spinning of a formed slot machine reels, according to an embodiment.

FIG. 7 is a screen shot illustrating a spinning of a formed slot machine reels, according to an embodiment.

Note that in FIG. 6, the player has now selected the set of slot machine reels at (1,4); (2,4); (3,4); (4,4); (3,5); (4,5); (5,5) by clicking (in operation 302) one of these tiles (the highlighted pears) from FIG. 6. This initiates a spin (operation 305) of this set of slot machine reels. Shown is the reels spinning (a "blur" animation is shown). The bet amount is also deducted from the player's credit meter to initiate the spinning.

Figure 8:
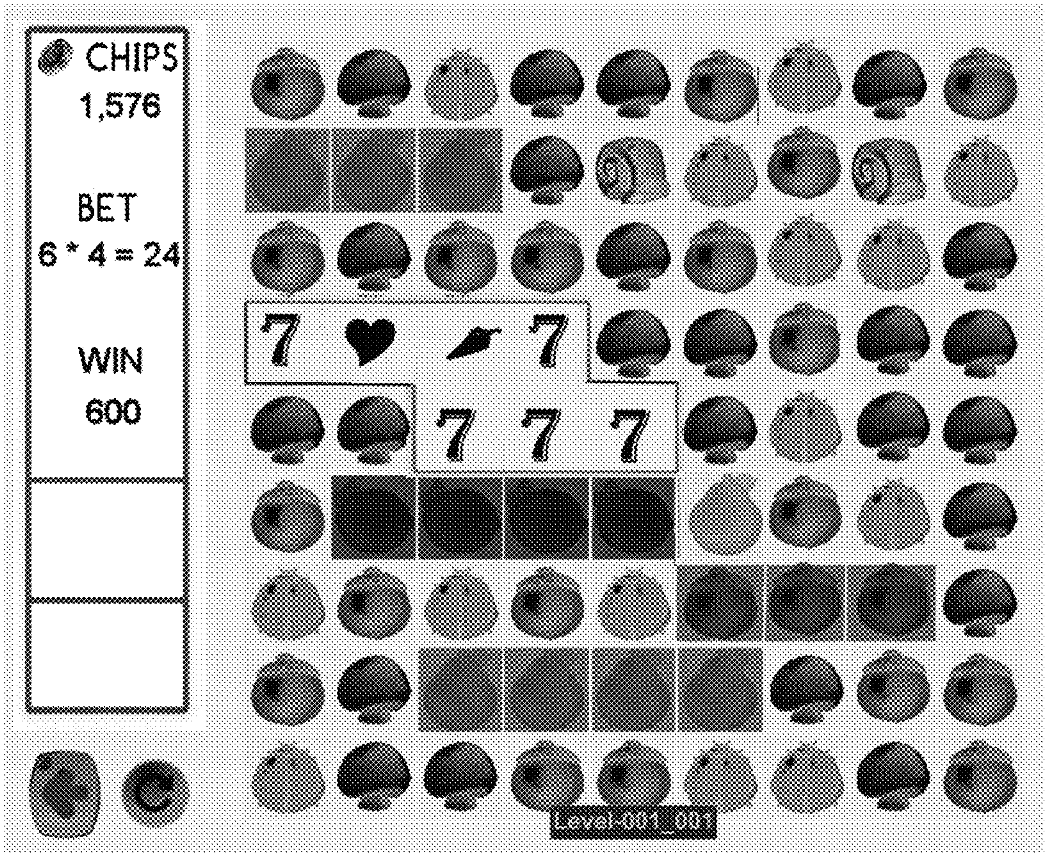
FIG. 8 is a screen shot illustrating a final position of the formed slot machine reels, according to an embodiment.

FIG. 8 is a screen shot illustrating a final position of the formed slot machine reels, according to an embodiment.

From FIG. 7, the reels on the set of slot machine reels now each stop on a random symbol to form a random outcome (position). Any winning combination on all of the paylines used are now paid. Since this is a five column set of slot machine reels, the paytable for a five reel (symbol) game can be used. All winning paylines (lines) are paid and losing paylines are not paid. Winning amounts are added to the player's credit meter. Table IV below illustrates one example of a five reel paytable. Note that the set of slot machine reels has four paylines which have the following combinations: 7/heart/pepper/7/7; 7/heart/pepper/7/7; 7/heart/7/7/7; 7/heart/7/7/7. Using the paytable in Table IV, two of these paylines are winners (the "any four 7's") and two are losers (since they don't match to any payout on the paytable). Since six credits are bet on each payline, the payout for each of these lines is 6*50=300, thus the player wins 600 (300*2 paylines) for this spin. Thus, the player's credit meter is increased by 600.

TABLE IV

| Combination | Payout |
|---|---|
| 7-7-7-7-7 | 10000:1 |
| 7-7-7-7-any | 5000:1 |
| 7-7-7-any-any | 2500:1 |
| 7-7-any-any-any | 100:1 |
| Any four 7's | 50 |
| All others | lose (0 payout) |

Note that the symbols in the set of slot machine reels are entirely different from the symbols used for the tiles in the grid. Thus, the slot machine symbols (in operation 305) and the indicia used on the tiles which are selected and eliminated (in operation 307) are different do not share common symbols (although in another embodiment one or more symbols can be used for both the slot machine (operation 305) and the tile matching (operation 306) aspect).

Figure 9:
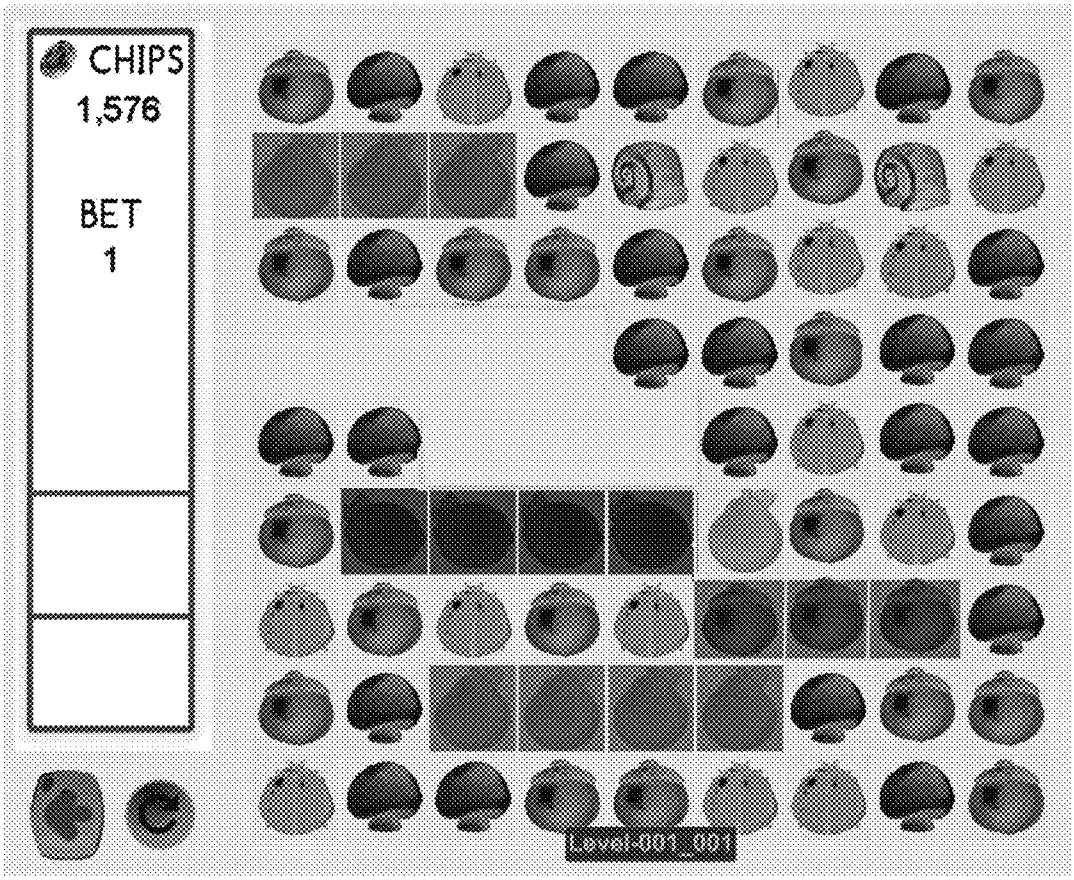
FIG. 9 is a screen shot illustrating elimination of the slot machine reels, according to an embodiment.

FIG. 9 is a screen shot illustrating elimination of the slot machine reels, according to an embodiment.

Since the spinning of the slot machine has terminated (a delay after the symbols stop spinning for a shot amount of time (e.g., 5 seconds) may occur so the player has time to view the results of the spinning), the symbols (tiles) in the set of slot machine reels now disappear (operation 306). Thus, these symbols are shown as removed in FIG. 9.

Figure 10:
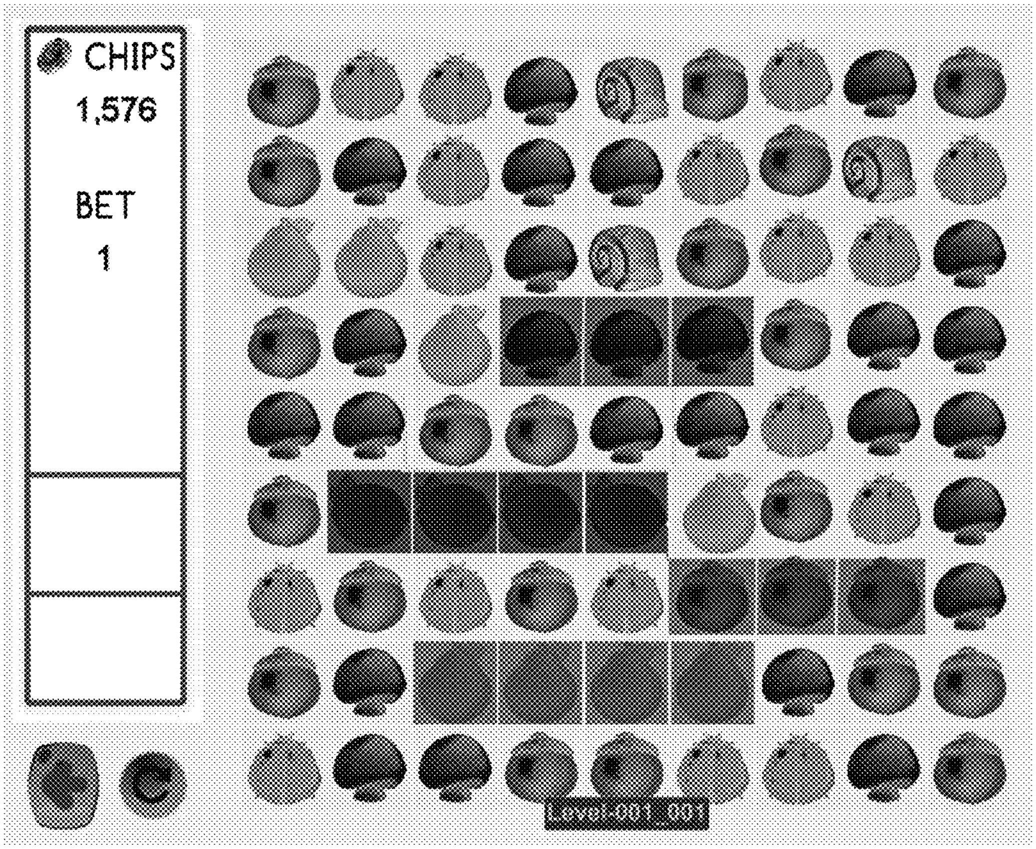
FIG. 10 is a screen shot illustrating fallen tiles to replace the empty slot machine reels, according to an embodiment.

FIG. 10 is a screen shot illustrating fallen tiles to replace the empty slot machine reels, according to an embodiment.

After the symbols in the set of slot machine reels have been removed in FIG. 9, the tiles now fall downward (see operation 309) resulting in the configuration in FIG. 10.

Figure 11:
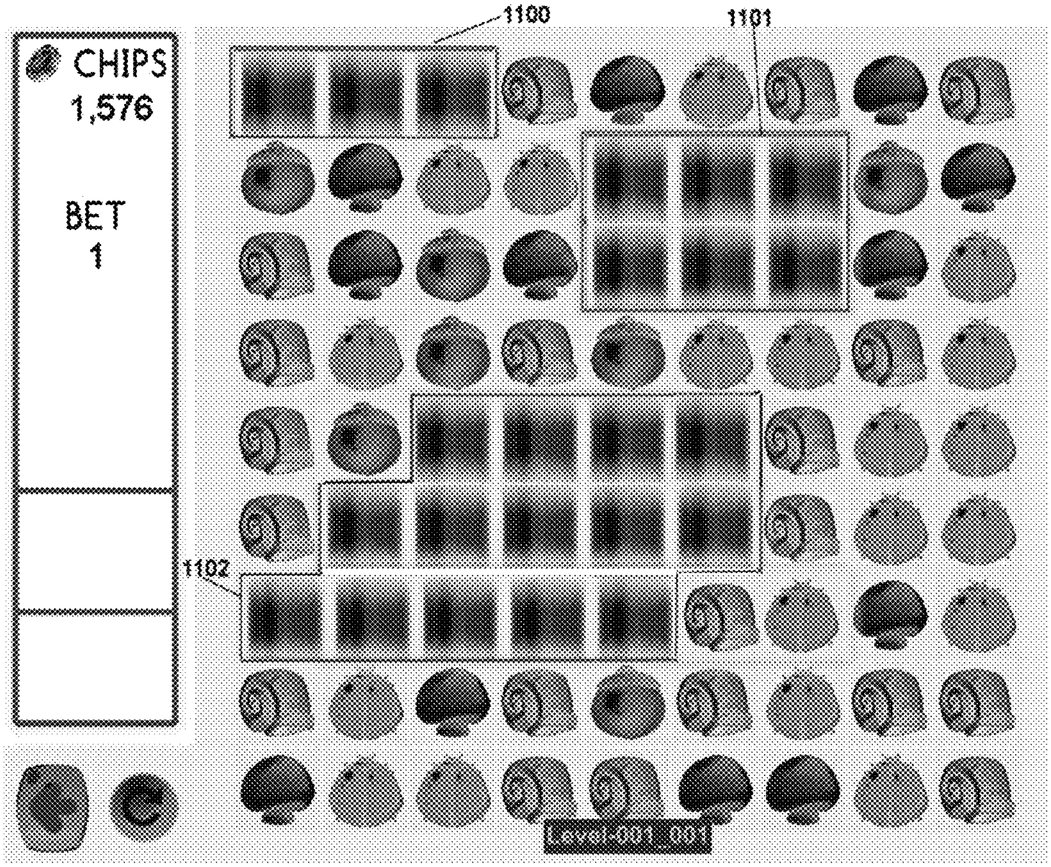
FIG. 11 is a screen shot illustrating three different sets of slot machine reels, according to an embodiment.

FIG. 11 is a screen shot illustrating three different sets of slot machine reels, according to an embodiment.

A first set of slot machine reels 1100 is a simple 3 by 1 (3×1) configuration with only one payline of three symbols. A second set of slot machine reels 1101 is a 3×2 configuration and hence there are 8 paylines. A third set of slot machine reels 1102 is an irregular (because it is not a square or rectangle) configuration and there are 1*2*3*3*3*2=108 paylines. As illustrated, sets of slot machine reels can come in any size and shape so long as there is a row of at least three consecutive like symbols which have a symbol vertically adjacent (directly above or below) another like symbol in its own row of at least three consecutive like symbols. In this manner, there would be an unlimited (subject to the size of the grid) size (both horizontally and vertically) of a set of slot machine reels that can be formed.

In a further embodiment, when the set of slot machine reels completes spinning it can (at random) reveal "power-ups" on one or more of the tiles in the set of slot machine reels (e.g., the symbol which appears on the reel is a power-up). A power-up can have special functionality. For example, a "wild" power-up (different than a wild symbol on the slot machine game) can cause a wild symbol to appear on the grid (in a random position, or the wild power-up can remain in its current position after the other slot machine symbols dissolve. The wild power-up would then serve as a wild symbol and would match any other tiles on the grid. Thus, if the player clicks a "mushroom" tile which represents a group of mushroom tiles and the wild tile is adjacent (horizontally or vertically) to any mushroom tile in the group then the wild tile would count as a mushroom tile (or any other tile in order to become part of any adjacent group).

Figure 12:
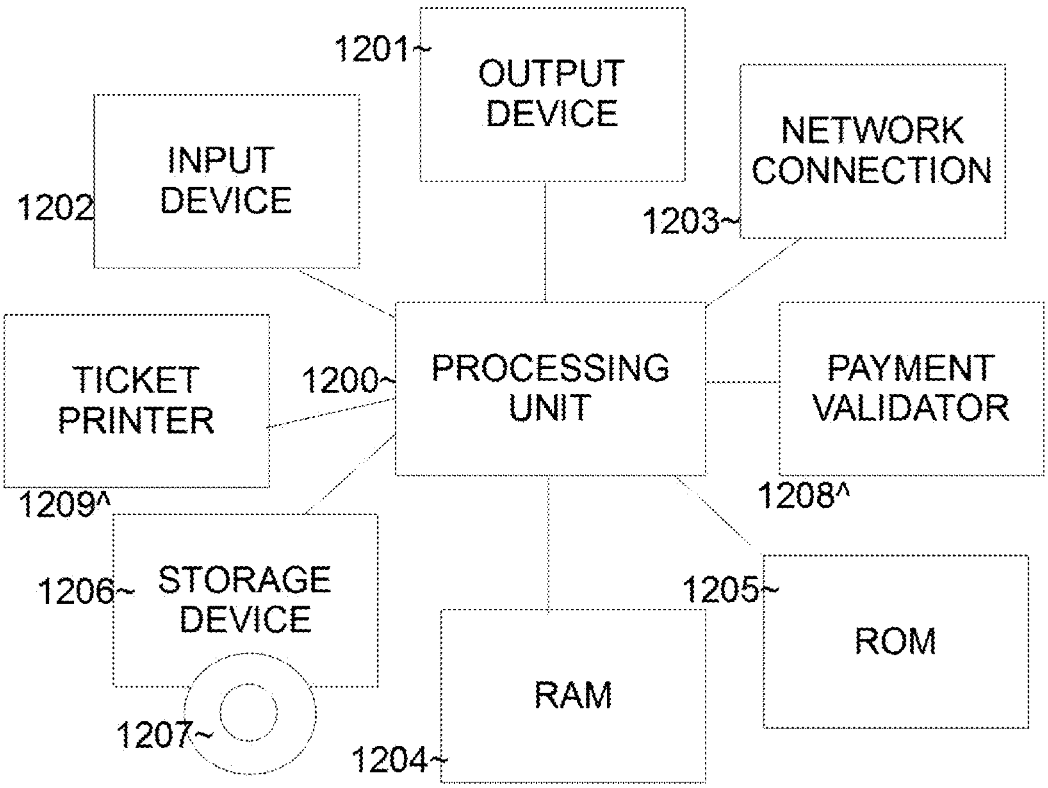
FIG. 12 is a block diagram illustrating exemplary hardware that can be used to implement the game described herein, according to an embodiment.

FIG. 12 is a block diagram illustrating exemplary hardware that can be used to implement the game described herein, according to an embodiment. The hardware in FIG. 12 can be used to implement a computer implementing the game described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site. The hardware can also be, for example, an electronic gaming machine (EGM) used in casinos such as a video slot machine. The hardware can also be a personal computer, playing the game using the Internet at an Internet casino for real money. The hardware can also be any computing device, such as a cellular phone, tablet, etc., and the methods described herein can be installed as software (e.g., an app) on the device. The hardware can also be any other type of device, working individually or in conjunction with other devices.

A processing unit 1200 (such as a microprocessor and any associated components) is connected to an output device 1201 (such as an LCD monitor, touch screen, CRT, etc.) which is used to display to the player any aspect/output/state of the method, and an input device 1202 (e.g., buttons, a touch screen, a keyboard, mouse, etc.) which can be used to input from the player any decision/input made by the player. All methods described herein can be performed by the processing unit 1200 by loading and executing respective instructions. Multiple such processing units can also work in collaboration with each other (in a same or different physical location). The processing unit 1200 can also be connected to a network connection 1203, which can connect the electronic gaming device to a computer communications network such as the Internet, a LAN, WAN, etc. The processing unit 1200 is also connected to a RAM 1204 and a ROM 1205. The processing unit 1200 is also connected to a storage device 1206 which can be a disk drive, DVD-drive, CD-ROM drive, flash memory, etc. A non-transitory computer readable storage medium 1207 (e.g., hard disk, CD-ROM, etc.), can store a program which can control the electronic device to perform any of the methods described herein and can be read by the storage device 1206.

The processing unit 1200 can also be connected to a payment validator 1208. The payment validator can be a bill acceptor which accepts currency, identifies it as being valid (typically by using an optical scanner), and then credits the inserted bill amount to the machine (for example inserting a $10 bill will credit the machine with $10 in credits). The bill acceptor can also accept cashless tickets as part of a 'ticket-in-ticket-out" system, in which tickets (cashless vouchers) have cash value and can be inserted into the payment validator 1208. The validator 1208 validates the ticket (typically be optically scanning a bar-code), communicating electronically with a casino database to verify the ticket is authentic, and once authenticated then crediting the machine with the respective amount of credits. The payment validator 1208 can also include a card reader which can read cards (e.g., with a magnetic stripe or other electronic encoding) so that an account number can be accessed. The cards can be a credit card, player loyalty card, specific casino payment card, or any card that can provide electronic access to a monetary amount owned by the player (owner of the card) which the player can utilize for depositing money and then playing the machine. If such a card is used, then the player can optionally enter (using a keypad) an amount the player wishes to withdraw from the account associated with the card to credit to the machine.

The processing unit 1200 can also be connected to a ticket printer 1209 which can print tickets (cashless vouchers). When the player cashes out on the machine (indicated to the machine that the player wishes to cash out and terminate by, typically by pressing a button), a ticket is printed by the ticket printer 1209 which carries the amount of credits left on the machine. This ticket can then be used to play other machines in the casino by inserting them into that machine's payment validator. The ticket can also be used to redeem for cash by inserting it into a ticket redemption machine (kiosk) which receives a ticket, validates it (typically by scanning the barcode), and then dispenses an identical amount of cash to what the ticket's value is.

While one processing unit is shown, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

Figure 13:
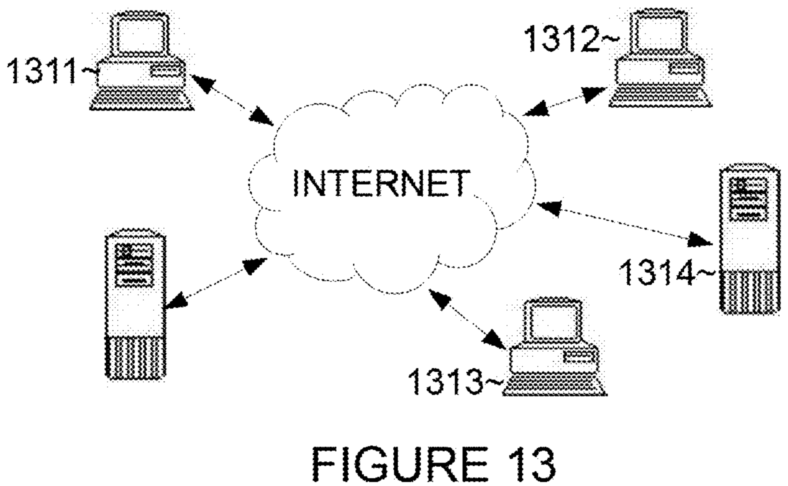
FIG. 13 is a network diagram showing a network structure for a social networking web site and players, according to an embodiment.

FIG. 13 is a network diagram showing a network structure for a social networking web site and players, according to an embodiment. The online game which awards and stores loyalty points can also be accomplished by the system illustrated in FIG. 13.

A computer communications network (such as the Internet) can be used to connect a host server 1310 which can host and serve a social networking site. Note that while FIG. 13 shows only one server as the host server 1310, the host server 1310 can encompass numerous servers all cooperating with each other (whether in the same physical location or not). The host server 1310 communicates with players 1311, 1312, 1313 through the Internet (or other computer communication network) and can implement any of the methods herein by executing computer code programmed accordingly. Game server 1314 can also implement all games and methods described herein on the site by executing computer code programmed accordingly. The game server 1314 is connected to the Internet and can communicate with all of the players 1311, 1312, 1313 directly or indirectly through the social networking site hosted by the host server 1310. The game server 1314 can cooperate with the host server 1310 so that the games run on the game server 1314 can be integrated into the social networking site hosted by the host server 1310. The game server can also be optional and all of the games can be also hosted on the host server 1310, whereby the integration of the games served/hosted by the game server 1314 will appear embedded in the social networking site hosted by the host server 1310 such that players would typically not realize (or care) that multiple servers are cooperating in order to play games on the social networking site. All of the communications described herein can be effectuated using such a network configuration. Typically, the communications are effectuated on the social networking site itself, thus the players 1311, 1312, 1313 should be logged into the social networking site in order to participate herein, although logging in is not required (e.g., communications can be transmitted using other methods, such as email, IRC chat, instant message, etc.) The host server 1310 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a game, the method comprising:

executing non-transitory computer readable instructions on at least one electronic processor connected to an electronic input device and an electronic output device, the computer readable instructions causing the at least one electronic processor to perform:

displaying a grid of tiles on the electronic output device;

providing a tile cascade operation which comprises a) removing the group of like tiles in the grid, b) replacing empty spaces in the grid; c) identifying all rows of three or more adjacent like tiles in the grid and highlighting each of the rows of three or more adjacent like tiles as a set of slot machine reels;

providing a slot spin operation comprising a) spinning the set of slot machine reels to a final combination; b) determining whether the final combination qualifies for a winning payout and awarding any such winning payout; c) removing the set of slot machine reels in the grid; d) replacing empty spaces in the grid; e) identifying all rows of three or more adjacent like tiles in the grid and highlighting each of the rows of three or more adjacent like tiles as a set of slot machine reels;

receiving a selection from a player using the electronic input device;

providing an input processing operation comprising a) upon the selection being a group of like tiles, then implementing the tile cascade operation; b) upon the selection being a set of slot machine reels, then implementing the slot spin operation; and implementing the input processing operation.

2. The method as recited in claim 1, wherein the computer readable instructions further cause the at least one electronic processor to perform:

continuously repeating the implementing the input processing operation.

3. The method as recited in claim 1, wherein the computer readable instructions cause the tile cascade operation to further comprise increasing a bet based on the like tiles in the grid.

4. The method as recited in claim 1, wherein the computer readable instructions cause the tile cascade operation to further comprise identifying vertical sets of slot machine reels which are vertically adjacent to each other and highlighting the vertical sets of slot machine reels as a single set of slot machine reels in multiple rows.

5. The method as recited in claim 4, wherein the computer readable instructions further cause the vertical sets of slot machine reels to be a rectangular shape.

6. The method as recited in claim 4, wherein the computer readable instructions further cause the vertical sets of slot machine reels to not be a rectangular shape.

7. The method as recited in claim 1, wherein the computer readable instructions further cause the symbols for the tiles in the grid to be different symbols from the symbols used for the reels.

8. The method as recited in claim 7, wherein the computer readable instructions further cause the symbols used for the reels to comprise at least one power-up symbol.

9. The method as recited in claim 1, wherein the computer readable instructions cause the slot spin operation to apply a bet to a plurality of paylines on the set of slot machine reels.

10. The method as recited in claim 9, wherein there are a maximum number of paylines possible considering the arrangement of reels in the set of slot machine reels.

11. An apparatus, comprising:

an electronic output device;

an electronic input device;

at least one electronic processor configured to read a non-transitory computer readable storage medium and execute instructions contained therein;

the non-transitory computer readable storage medium store computer readable instructions which, when executed, cause the at least one electronic processor to:

display a grid of tiles on the electronic output device;

provide a tile cascade operation which comprises a) remove the group of like tiles in the grid, b) replace empty spaces in the grid; c) identify all rows of three or more adjacent like tiles in the grid and highlight each of the rows of three or more adjacent like tiles as a set of slot machine reels;

provide a slot spin operation comprising a) spin the set of slot machine reels to a final combination; b) determine whether the final combination qualifies for a winning payout and awarding any such winning payout; c) remove the set of slot machine reels in the grid; d) replace empty spaces in the grid; e) identify all rows of three or more adjacent like tiles in the grid and highlighting each of the rows of three or more adjacent like tiles as a set of slot machine reels;

receive a selection from a player using the electronic input device;

provide an input processing operation comprising a) upon the selection being a group of like tiles, then implement the tile cascade operation; b) upon the selection being a set of slot machine reels, then implement the slot spin operation; and implement the input processing operation.

12. The apparatus as recited in claim 11, wherein the computer readable instructions are further programmed to cause the at least one electronic processor to perform:

continuously repeat the implementing the input processing operation.

13. The apparatus as recited in claim 11, wherein the computer readable instructions are further programmed such that the tile cascade operation further comprises increase a bet based on the like tiles in the grid.

14. The apparatus as recited in claim 11, wherein the computer readable instructions are further programmed such that the tile cascade operation further comprises identify vertical sets of slot machine reels which are vertically adjacent to each other and highlight the vertical sets of slot machine reels as a single set of slot machine reels in multiple rows.

15. The apparatus as recited in claim 14, wherein the computer readable instructions are further programmed such that the vertical sets of slot machine reels are a rectangular shape.

16. The apparatus as recited in claim 14, wherein the computer readable instructions are further programmed such that the vertical sets of slot machine reels are not a rectangular shape.

17. The apparatus as recited in claim 11, wherein the computer readable instructions are further programmed such that the symbols for the tiles in the grid are different from symbols used for the reels.

18. The apparatus as recited in claim 17, wherein the computer readable instructions are further programmed such that the symbols used for the reels comprise at least one power-up symbol.

19. The apparatus as recited in claim 11, wherein the computer readable instructions are further programmed such that the slot spin operation further comprises apply a bet to a plurality of paylines on the set of slot machine reels.

20. The apparatus as recited in claim 19, wherein the computer readable instructions are further programmed such that the slot spin operation applies the bet to a maximum number of paylines possible considering the arrangement of reels in the set of slot machine reels.

* * * * *